United States Patent
Wu et al.

(10) Patent No.: US 7,910,015 B2
(45) Date of Patent: Mar. 22, 2011

(54) POLYMER ELECTROLYTE FOR DYE SENSITIZED SOLAR CELL

(75) Inventors: Chun-Guey Wu, Taoyuan County (TW);
Ming-Yi Lu, Taoyuan County (TW);
Chwei-Huann Chiou, Taoyuan County (TW); Yun-Fang Lu, Taoyuan County (TW)

(73) Assignee: Institute of Nuclear Energy Research, Tiann Village, Longtan, Taoyuan (TW)

( * ) Notice: Subject to any disclaimer, the term of this patent is extended or adjusted under 35 U.S.C. 154(b) by 638 days.

(21) Appl. No.: 11/875,962

(22) Filed: Oct. 22, 2007

(65) Prior Publication Data
US 2009/0101863 A1   Apr. 23, 2009

(51) Int. Cl.
*H01L 31/00* (2006.01)
(52) U.S. Cl. ....... 252/62.2; 136/263; 429/316; 429/317; 429/323; 429/331
(58) Field of Classification Search .......... 252/62.2; 136/263; 429/316, 317, 323, 331
See application file for complete search history.

(56) References Cited

U.S. PATENT DOCUMENTS

2005/0092359 A1* 5/2005 Uchida et al. .................. 136/256
2005/0109385 A1* 5/2005 Kim et al. ..................... 136/252

FOREIGN PATENT DOCUMENTS

WO   WO 2008/032016   *   3/2008

* cited by examiner

*Primary Examiner* — C. Melissa Koslow

(57) ABSTRACT

A polymer electrolyte for dye sensitized solar cell is provided. The electrolyte contains a porous hybrid polymer (the components were listed in formula (1) and formula (2)) and the electrolyte solution (the components were shown in formula (3)).

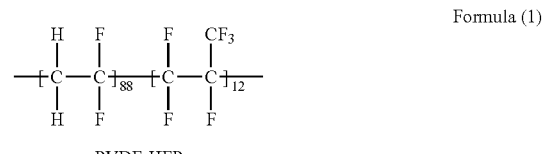

PVDF-HFP

Formula (1)

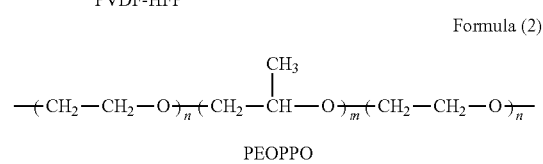

PEOPPO

Formula (2)

The weight ratio of PEOPPO to PVDF-HFP is from 1~80%
The weight ratio of EO to PO in PEOPPO is from 30 to 80%

EC/PC/LiI/I$_2$/TBP                Formula (3)

EC is ethylene carbonate
PC is propylene carbonate
TBP is 4-tert-butylpyridine

The weight ratio of EC to PC is 0.1~5; the ratio of EC to LiI is 0.1~2; the ratio of EC to I$_2$ is 0.01~0.2; the ratio of EC to TBP is 0.1~1;
  wherein the range of n and m for PEOPPO is n=20~150, and m=10~80.

3 Claims, No Drawings

POLYMER ELECTROLYTE FOR DYE SENSITIZED SOLAR CELL

FIELD OF THE INVENTION

The invention is related to a type of material for solar cell. Especially, it refers to an electrolyte suitable for dye-sensitized solar cell (DSSC).

DESCRIPTION OF THE PRIOR ART

With development in technology and economy, human use a great amount of energy. The major energy sources presently, such as petroleum, natural gas and coal et al., are all contaminating energies, which will destruct our environment if they are highly utilized. Besides, such contaminating energies are facing shortage issues. Therefore, advanced countries have started developing non-contaminating energy or renewable energies.

Since solar energy is an undepletable and non-contaminating energy, it always receives the most attention when people are dealing with issues with contamination and shortage. Particularly, solar cell, which can directly convert solar energy into electric energy, is an essential research subject presently. A decade ago, so-called dye-sensitized solar cell (DSSC) proposed by Grätzel and O'Regan could effectively utilize solar energy and attracted attention from the academia and the industry. In general, the structure for dye-sensitized solar cell comprises four parts. They are cathode/anode to provide the path for electric current, semiconductor $TiO_2$ to accept electrons, dye layer and electrolyte to transport electronic holes. The material for each part of the above-mentioned dye-sensitized solar cell and the interfacial structure between parts can affect device efficiency. However, the type and stability for electrolyte is essential to determine whether dye-sensitized solar cell can commercialize. Thus, developing electrolyte with high stability and high efficiency is an important subject presently.

SUMMARY OF THE INVENTION

The objective for the invention is to provide a quasi-solid electrolyte, which has high stability due to quasi-solid nature, and fair conductivity because polymer support has a proper amount of electrolyte solution, so the dye-sensitized solar cell that utilizes the quasi-solid electrolyte has good light-to-electric energy conversion efficiency.

The invention gives a quasi-solid electrolyte, which is a porous polymer support (as shown in Formula (1) and Formula (2)) containing electrolyte solution (as shown in Formula 3).

The weight ratio of PEOPPO to PVDF-HFP is 1~80%. The weight percent for EO and PO in PEOPPO is 30~80%, wherein the range of n and m for PEOPPO is n=20~150, and m=10~80;

$$EC/PC/LiI/I_2/TBP \quad \text{Formula (3)}$$

EC is Ethylene carbonate
PC is Propylene carbonate
TBP is 4-tert-butylpyridine

The ratio of EC to PC is 0.1~5; the ratio of EC to LiI is 0.1~2; the ratio of EC to $I_2$ is 0.01~0.2; the ratio of EC to TBP is 0.1~1.

For the quasi-solid electrolyte mentioned in the embodiment for the present invention, the weight of PEOPPO to PVDF-HFP is 1~80%.

For the quasi-solid electrolyte mentioned in the embodiment for the present invention, the weight percent for EO and PO in PEOPPO is 30~80%.

For the quasi-solid electrolyte mentioned in the embodiment for the present invention, the weight ratio of EC to PC in $EC/PC/LiI/I_2/TBP$ is 0.1~5; the weight ratio of EC to LiI is 0.1~2; the weight ratio of EC to $I_2$ is 0.01~0.2; the weight ratio of EC to TBP is 0.1~1.

The porous composite polymer support for the quasi-solid electrolyte for the present invention has the compositions in the above formula (1) and (2). So they can absorb a great amount of electrolyte solution and still remain solid. This will facilitate the following cell assembly process. Another electrolyte composition for quasi-solid electrolyte is shown in formula (3), so it uses solvents of high boiling point and has relatively high stability. The long-term stability for the dye-sensitized solar cell (DSSC) made with the quasi-solid electrolyte from the invention has better long-term stability than the traditional DSSC made with liquid electrolyte. Besides, the quasi-solid electrolyte for the invention can be used for lithium-ion battery in addition to dye-sensitized solar cell.

For the above and other objectives, characteristics and benefits for the invention to be understood easily, the following section provides detailed description with examples and illustrations.

DETAILED DESCRIPTION OF THE PREFERRED EMBODIMENT

The invention provides a quasi-solid electrolyte, which is a porous composite polymer support that absorbs a great amount of electrolyte solution. The porous composite polymer support contains polymer mixture as shown in formula (1) and formula (2). The electrolyte solution is a mixture of five materials as shown in formula (3).

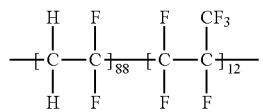

PVDF-HFP

Formula (1)

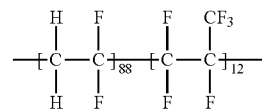

PVDF-HFP

Formula (1)

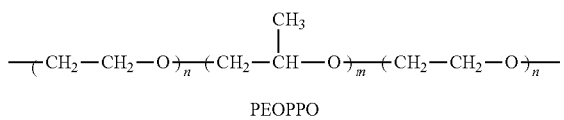

PEOPPO

Formula (2)

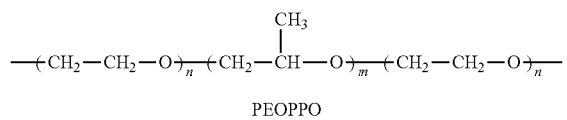

PEOPPO

Formula (2)

The weight ratio of PEOPPO to PVDF-HFP is 1~80%. The weight ratio for EO and PO in PEOPPO is 30~80%, wherein the range of n and m for PEOPPO is n=20~150, and m=10~80;

$$EC/PC/LiI/I_2/TBP \qquad \text{Formula (3)}$$

EC is Ethylene carbonate
PC is Propylene carbonate
TBP is 4-tert-butylpyridine

The weight ratio of EC to PC is 0.1~5; the weight ration of EC to LiI is 0.1~2; the weight ratio of EC to $I_2$ is 0.01~0.2; the weight ratio of EC to TBP is 0.1~1.

Since the quasi-solid electrolyte in the present invention has the special structure as in the above formula (1) and formula (2), the polymer support for the quasi-solid electrolyte contains a great amount of pores and can absorb a large amount of electrolyte solution without leaking and offer high stability. Another electrolyte composition for the quasi-solid electrolyte in the present invention is shown in formula (3). It uses a mixture of EC and PC with high boiling point as solvent, so it has relatively high stability. Besides, the long-term stability for the dye-sensitized solar cell (DSSC) made with the quasi-solid electrolyte in the present invention is higher stability and easier cell assembly than that for the DSSC made with traditional liquid electrolyte. In other words, when the quasi-solid electrolyte is used for dye-sensitized solar cell (DSSC), the electrolyte is solid and facilitates assembly. Either the polymer support that can hold the electrolyte solution or the use of solvents with high boiling point will prevent cell from leaking and lowering its light-to-electric energy conversion efficiency and provide long-term stability. In the following section, there will be further detailed description for the physical properties for the quasi-solid electrolyte in the present invention.

The following gives an example of synthesizing the quasi-solid electrolyte in the invention. There are two methods to prepare the quasi-solid electrolyte. However, the following examples do not limit the scope of the invention.

Example 1

One example of synthesis in the invention is the quasi-solid electrolyte composition (expressed by ASE-1 in the following), i.e. ASE-1, the weight ratio of formula (1) to formula (2) is 43%, and the electrolyte as in formula (3) with weight ration for EC:PC:LiI:$I_2$:TBP=1:2:0.17:0.033:0.17.

<Process>

Dissolve 2 g PVdF-HFP polymer and 6.16 g EC into 6 ml acetone solvent. Heat to 60° C. and stir the mixture until complete dissolution. Lower the temperature to room temperature. Add 0.8571 g F108 polymer which is a trade name for PEOPPO (shown in formula (2)) with n equal to 133, m equal to 50.

Heat to 60° C. and stir the mixture until both polymers dissolve and mix evenly. Pour the polymer solution and spread it evenly with a draw-down bar. After the solvent flashes off, polymer membrane support is obtained. The polymer is subject to absorbing electrolyte solution (weight ratio of EC, PC, LiI, $I_2$ and TBP is 1:2:0.17:0.033:0.17) to obtain polymer electrolyte membrane, which ionic conductivity is $3.71 \times 10^{-3}$ S/cm$^2$.

Example 2

Example 2 describes one synthesis method for the quasi-solid electrolyte (ASE-2) in the invention: temporarily called direct evaporation method for electrolyte membrane.

<Process>

Take 0.4 g PVdF-HFP polymer. Use 3 ml acetone as solvent. Heat the mixture up to 60° C. and stir it until complete dissolution. Add 0.174 g F108 to the mixture and heat and stir it until both polymers completely mix. After temperature is lowered, add the electrolyte solution, which composition is that weight ration for EC, PC, LiI, $I_2$, TBP and acetonitrile is 1:2:0.33:0.061:0.16:1.3. After addition of electrolyte solution, mix evenly and use a draw-down bar to spread the polymer solution onto the support. When acetonitrile flashes off, the polymer electrolyte membrane is obtained, which ionic conductivity is $3.68 \times 10^{-3}$ S/cm$^2$.

The following is to describe the assembly method for the dye-sensitized solar cell made with quasi-solid electrolyte in the invention and the measurement for the cell performance. The dye-sensitized solar cell made with ASE-1 was compared to the cell made with traditional liquid electrolyte for their performance.

The assembly method for the dye-sensitized solar cell in the invention is as follows: First, prepare titanium dioxide gel. Mix 72 ml titanium (IV) isopropoxide (98%, Across) and 0.1M nitric acid up to 450 ml in total volumn. Continue to stir the mixture and heat to 85° C. for reaction for 8 hours. Cool to room temperature to obtain the gel, which will go to filtration afterward. The gel material is subject to autoclave heating to 240° C. for reaction for 12 hours to obtain crystal titanium dioxide granuals. After the titanium dioxide filtrate is concentrated to 13 wt %, 30 wt % (relative to titanium dioxide) PEG (MW=200,000 and 20,000) to form titanium dioxide gel. Use a glass rod to spread the gel onto conductive galss (FTO, unit surface resistivity is above 15 ohms Hartford). The first two layers are titanium dioxide gel that contains PEG of MW 200,000. The third layer is the titanium dioxide gel that contains PEG of MW 20,000. Lastly, the fourth layer is titanium dioxide gel that contains different sizes of titanium dioxide particles (300 nm and 20 nm, weight ratio is 30% and 70%). After blowing dry of the titanium dioxide membrane, let it stay at room temperature for 30 minutes. Then, heat it up to 500° C. at 20° C./min. Heat is at 500° C. for 30 minutes.

Immerse the prepared titanium electrode (effective area 0.16 cm$^2$, thickness 20 µm) in $2 \times 10^{-4}$M dye solution for 24 hours. Coat it on ITO glass with platinum (thickness 100 nm) (resistivity per unit area is 8~10 ohm) as counter electrode. Clamp the electrolyte membrane between titanium dioxide electrode and the counter electrode to obtain dye-sensitized solar cell. The general assembly method for the dye-sensitized solar cell that uses liquid electrolyte is to put hollow ionic polymer resin (Surlyn 1702, Dupont, thickness 80 µm) between two electrodes. There are two holes on resin to facilitate filling of electrolyte solution. Then, the entire device is subject to heating to 80° C. until complete tightness is reached. When the device is cooled to room temperature, electrolyte is added through prepared holes. Finally, Ton Seal® cement (Varian, Mass., USA) is used to seal the two holes. Therefore, the assembly for cell made with solid electrolyte is easier than that with liquid electrolyte. The measurement for optoelectric property for the cell is conducted with a light source of Oriel solar simulator, #6266, and filter of Oriel, #81075 to simulate device under sunlight exposure. Potentiostat/galvanostat (PGSTAT 30, Autolab, Eco-Chemie, Netherland) is used to measure current-voltage characteristic curve for the cell, which will lead to open circuit potential, short-circuit current, fill factor and light-to-electric energy conversion efficiency.

The result for the comparison of performance between the dye-sensitized solar cell made with quasi-solid electrolyte and the cell made with traditional liquid electrolyte is shown in Table 1

TABLE 1

| electrolyte | $V_{oc}$/V | $J_{sc}$/mA cm$^{-2}$ | ff | η (%) |
|---|---|---|---|---|
| Traditional liquid electrolyte | 0.69 | 6.7 | 0.39 | 1.8 |
| ASE-1 | 0.7 | 3.4 | 0.35 | 1.7 |
| ASE-2 | 0.72 | 2.3 | 0.44 | 1.5 |

It is known from Table 1 that although the cell made with quasi-solid electrolyte in the invention has lower performance than the cell made with traditional liquid electrolyte, the light-to-electric energy conversion efficiency for the former is still 80~90% of that for the latter. This indicates the quasi-solid electrolyte in the invention not only has the advantages of solid electrolyte but also fairly good light-to-electric energy conversion efficiency for the assembled cell. When the quasi-solid electrolyte is used for dye-sensitized solar cell, it is not only to have simplified cell assembly process but also good stability for the dye-sensitized solar cell.
Further, the quasi-solid electrolyte in the invention is used for dye-sensitized solar cell. Its performance and stability is measured. The dye-sensitized solar cell made with ASE-2 before assembly is measured for voltage, current and light-to-electric energy conversion efficiency. The cell is left for a period of time before it is measured for voltage, current and light-to-electric energy conversion efficiency again. The measurement result is listed in Table 2. Similarly, the traditional liquid electrolyte and the dye-sensitized solar cell made in the same way above are also measured for voltage, current and light-to-electric energy conversion efficiency. The cell is also left for a period of time before the same measurement of light-to-electric energy conversion efficiency again. The measurement result is also listed in Table 2 for comparison.

TABLE 2

| Electrolyte | Device holding time/hr | $V_{oc}$/V | $J_{sc}$/mA cm$^{-2}$ | ff | η (%) |
|---|---|---|---|---|---|
| Electrolyte solution | 0 | 0.69 | 6.7 | 0.39 | 1.8 |
|  | 168 | 0.41 | 0.06 | 0.34 | 0.0083 |
|  | 360 | 0.17 | 0.04 | 0.095 | 0.0007 |
| ASE-2 | 0 | 0.63 | 4.5 | 0.53 | 1.5 |
|  | 168 | 0.61 | 3.3 | 0.40 | 0.8 |
|  | 360 | 0.63 | 3.2 | 0.40 | 0.8 |

It is known from Table 2 that for the cell before assembly, the dye-sensitized solar cell made with ASE-2 has its light-to-electric energy conversion efficiency decrease to 53% of the original after a week. The dye-sensitized solar cell made with liquid electrolyte has its light-to-electric energy conversion efficiency decrease to 0 after a week. It is clear from Table 2 that the quasi-solid electrolyte in the invention has quasi-solid nature with low volatility, so the dye-sensitized solar cell has higher stability than the cell made with traditional liquid electrolyte.

On the other hand, besides the use for manufacturing dye-sensitized solar cell, the quasi-solid electrolyte can also be used as electrolyte in lithium-ion battery.

In summary, the feature for the quasi-solid electrolyte in the invention is in the compositions shown in formula (1) to (3) above, which can make the dye-sensitized solar cell have higher stability than the cell made with traditional liquid electrolyte. The invention can be used for other areas, such as lithium-ion battery, in addition to dye-sensitized solar cell.

Although the examples above are disclosed for the invention, they are not to limit the scope for the invention. Those skillful at this technology may have modification and alteration but without deviation from the principle and scope of the invention. The range of protection for the invention shall depend on the scope of the claims described later for the invention.

What is claimed is:

1. A quasi-solid electrolyte, which is a porous composite polymer (composition as shown in formula (1) and formula (2)), contains electrolyte solution (composition as shown in formula (3));

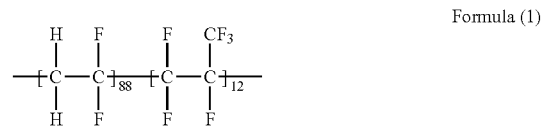

Formula (1)

PVDF-HFP

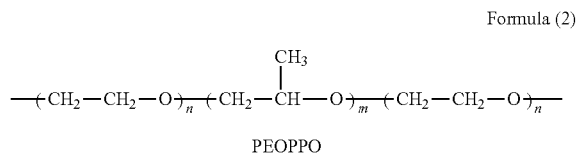

Formula (2)

PEOPPO wherein n=20~150, m=10~80;

EC/PC/LiI/I$_2$/TBP          Formula (3)

EC is Ethylene carbonate;
PC is Propylene carbonate;
TBP is 4-tert-butylpyridine.

2. The quasi-solid electrolyte of claim 1, wherein the weight ratio of PEOPPO to PVDF-HFP is 1~80%, and the weight percent for EO and PO in PEOPPO is 30~80%.

3. The quasi-solid electrolyte of claim 1, wherein the weight ratio of EC to PC is 0.1~5; the weight ratio for EC to LiI is 0.1~2; the weight ratio of EC to I$_2$ is 0.01~0.2, and the weight ratio of EC to TBP is 0.1~1.

* * * * *